(12) United States Patent
Meng

(10) Patent No.: US 6,427,890 B1
(45) Date of Patent: Aug. 6, 2002

(54) BICYCLE-USED FLOW DEFLECTING ARTICLE CABINET

(76) Inventor: Horizon Garrison Peter Meng, 65 Crestline Dr. #4, S.F., CA (US) 94131

( * ) Notice: Subject to any disclaimer, the term of this patent is extended or adjusted under 35 U.S.C. 154(b) by 0 days.

(21) Appl. No.: 09/685,040

(22) Filed: Oct. 10, 2000

(51) Int. Cl.$^7$ ................................................ B62J 11/00
(52) U.S. Cl. .................... 224/427; 224/414; 224/431; 224/435; 224/440; 224/926; 220/23.83
(58) Field of Search .............................. 224/414, 427, 224/428, 431, 433, 435, 440, 456, 461, 926; 220/23.4, 23.83

(56) References Cited

U.S. PATENT DOCUMENTS

| | | | |
|---|---|---|---|
| 2,229,756 A | * 1/1941 | McCann et al. | ........ 224/427 X |
| 3,212,661 A | * 10/1965 | Adell | .................... 220/23.4 X |
| 3,225,951 A | * 12/1965 | Poston et al. | .......... 220/23.4 X |
| 3,625,405 A | * 12/1971 | Kezar | ..................... 224/427 X |
| 4,235,343 A | * 11/1980 | Thompson | ............. 220/23.4 X |
| 4,260,085 A | * 4/1981 | Jefferson | ................. 224/427 X |
| 4,733,907 A | * 3/1988 | Fellenbaum | ................. 297/188 |
| 4,957,227 A | * 9/1990 | Trimble | ....................... 224/414 |
| 5,065,875 A | * 11/1991 | Balavich | ............... 220/23.4 X |
| 5,238,160 A | * 8/1993 | Faulds | ........................ 224/414 |
| 5,356,058 A | * 10/1994 | Fenton | .................... 224/427 X |
| 6,206,218 B1 | * 3/2001 | Young et al. | ............... 220/23.4 |

* cited by examiner

Primary Examiner—Stephen K. Cronin

(57) ABSTRACT

Bicycle-used flow deflecting article cabinet mounted on a rear side of a saddle of the bicycle. The article cabinet includes a main body having a curved shape and substantially triangular lateral faces. A front end of the main body is formed with a receptacle in which personal effects of the rider can be conveniently placed. A cover board is disposed on the surface of the main body for openably covering the receptacle. Two lateral sides of the main body are respectively formed with opposite concave indentations and a C-shaped clip is inlaid in an inner wall of each of the indentations for clamping and locating a liquid container. When riding the bicycle, the curved article cabinet provides a flow deflecting effect to balance the center of gravity of the bicycle body and increase the riding speed.

9 Claims, 5 Drawing Sheets

BICYCLE-USED FLOW DEFLECTING ARTICLE CABINET

BACKGROUND OF THE INVENTION

The present invention relates to a bicycle-used flow deflecting article cabinet in which personal stuffs of a rider can be conveniently placed. The article cabinet has curved pattern and can provide a flow deflecting effect when riding the bicycle so as to increase the riding speed.

A conventional bicycle lacks article cabinet for placing articles therein or kettle rack on which a kettle can be located. Also, the conventional bicycle is not equipped with any flow deflecting structure which is able to aid a rider in riding.

Moreover, the conventional bicycle has light weight so that when riding the bicycle at high speed, a turbulence often is produced behind or under the bicycle body to lead to unstability of the bicycle body. This makes it dangerous to ride the bicycle. Therefore, it is necessary to provide a measure which is able to provide a flow deflecting effect and balance the gravity center of the bicycle body so as to avoid floating and swinging of the tail of the bicycle body when riding a bicycle at high speed.

SUMMARY OF THE INVENTION

It is therefore a primary object of the present invention to provide a bicycle-used flow deflecting article cabinet mounted on a rear side of a saddle of the bicycle. The article cabinet includes a main body having curved pattern. The main body is formed with a receptacle in which personal stuffs of the rider can be conveniently placed. A cover board is disposed on the surface of the main body for openably covering the receptacle. Two lateral sides of the main body are respectively formed with opposite concave dents and a C-shaped clip is inlaid in an inner wall of each of the dents for clamping and locating a kettle. When riding the bicycle, the curved article cabinet provides a flow deflecting effect to. balance the gravity center of the bicycle body and increase the riding speed.

The present invention can be best understood through the following description and accompanying drawings wherein:

DETAILED DESCRIPTION OF THE PREFERRED EMBODIMENT

Please refer to FIGS. 1 to 4. The flow deflecting article cabinet of the present invention is mounted on a rear side of the saddle of the bicycle. The article cabinet is formed by a curved main body 1 with substantially triangular lateral faces.

Figure 1:
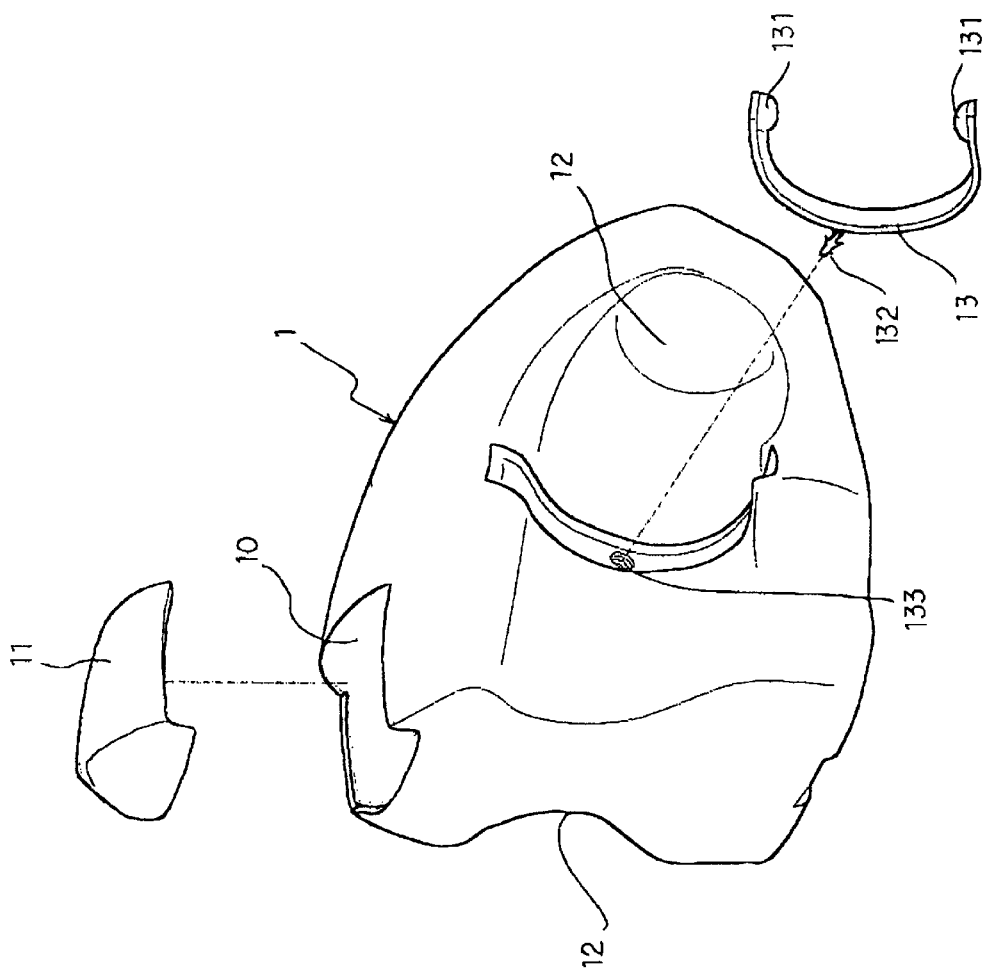
FIG. 1 is a perspective exploded view of the present invention.
Figure 2:
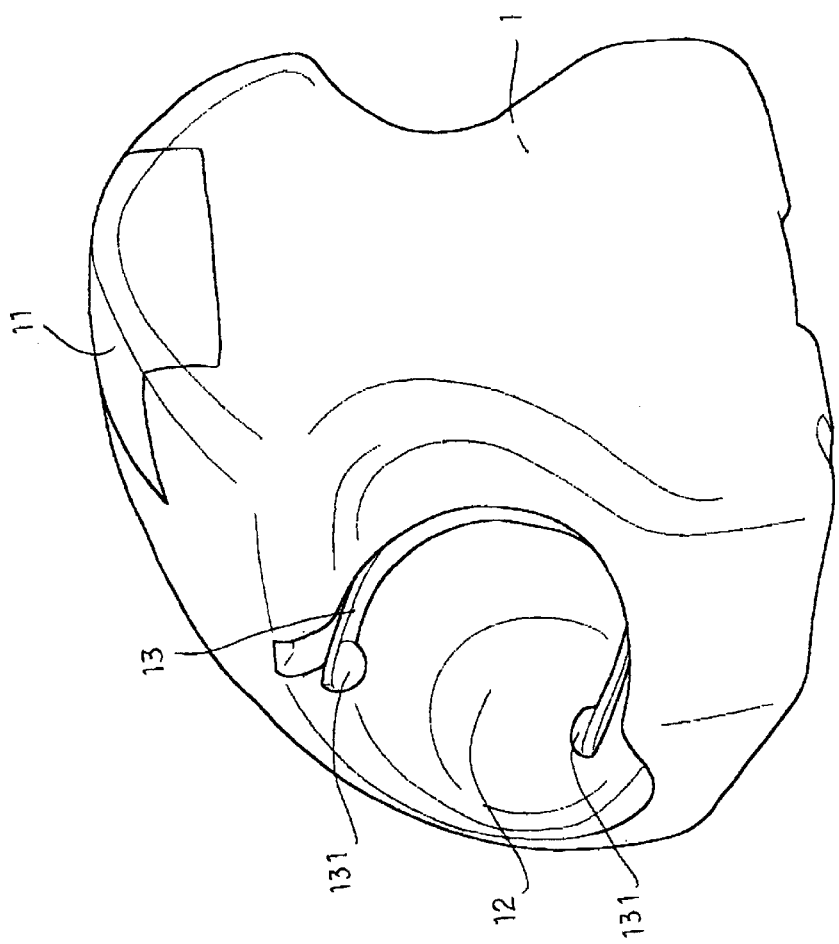
FIG. 2 is a perspective assembled view of the present invention.

As shown in FIG. 1, the main body 1 has a curved pattern with wider front side and narrower rear side and with low wind resistance. The main body 1 provides a low wind resistance effect to increase the riding speed of the bicycle The wider front end of the main body 1 is formed with a receptacle 10 covered by an openable cover board 11. Personal stuffs of a rider can be placed in the receptacle 10. Two lateral sides of the main body 1 are respectively formed with opposite dents 12 extending toward the center of the main body 1. The inner wall of the dent 12 is formed with an insertion hole 133, A C-shaped clip 13 having a reverse hook-like insertion section 132 is inlaid in the insertion hole 133. In addition, two ends of the C-shaped clip 13 are formed with dome-like engaging sections 131 for firmly clamping an article.

Figure 3:
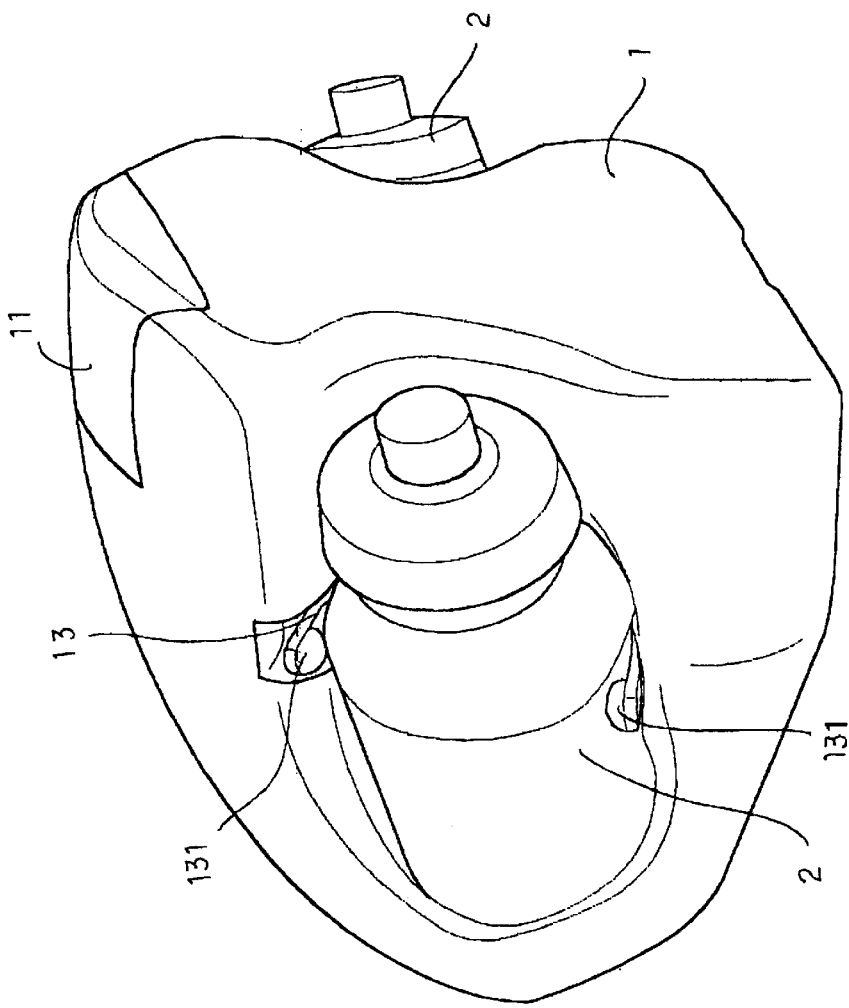
FIG. 3 is a perspective view showing the application of the present invention.
Figure 4:
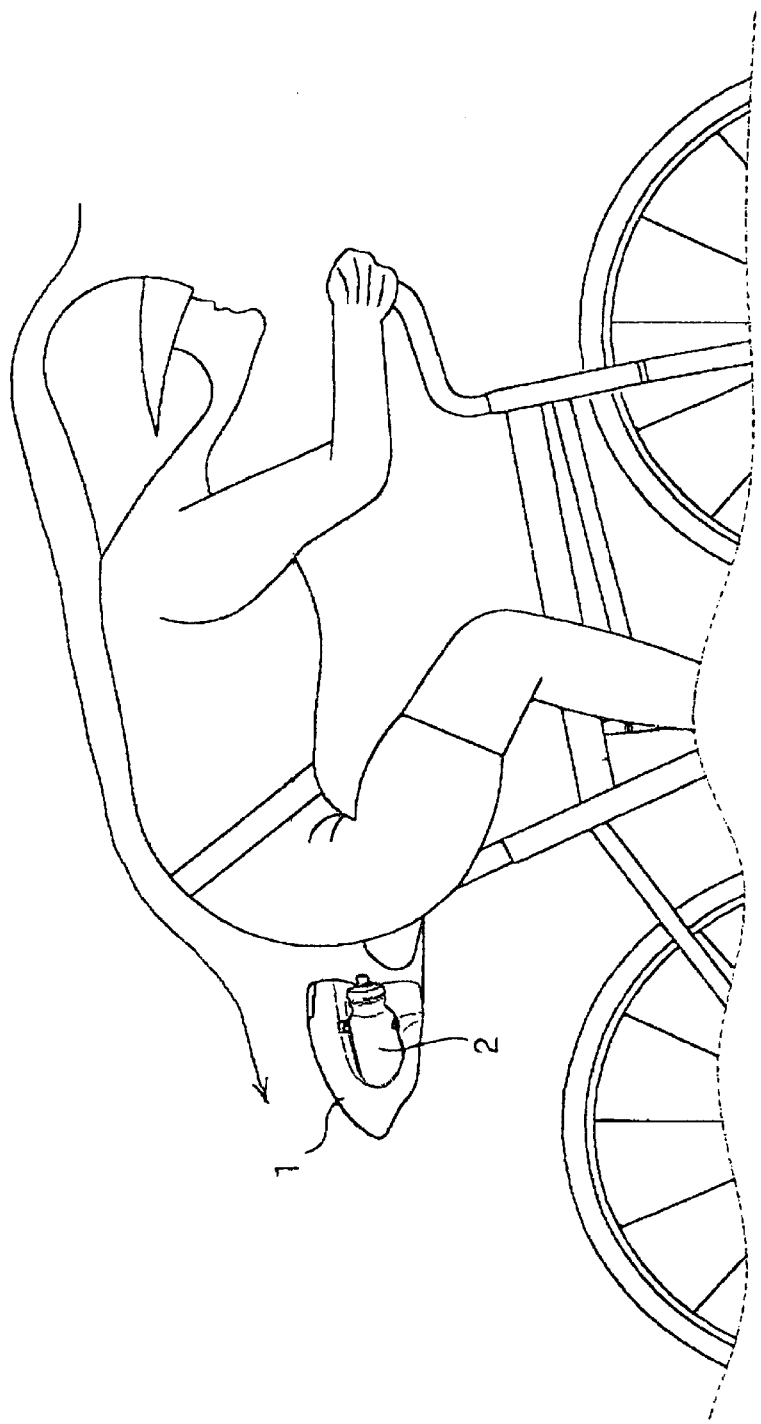
FIG. 4 shows that the present invention is mounted behind the saddle of a bicycle to achieve a flow deflecting effect.

Referring to FIGS. 3 and 4, in practical use, the main body 1 of the article cabinet is mounted on the rear side of the saddle of the bicycle. A user can place personal small articles (or medical articles) in the receptacle 10 of the main body 1 and then covers the receptacle 10 with the cover board 11. A kettle 2 can be inlaid in the dent 12 of each side of the main body 1. In riding the bicycle, the main body 1 cooperates with the rider's body to form a curved configuration and provides a flow deflecting effect. Accordingly, the riding speed can be increased. Also, the bicycle body can be kept in a balanced state so as to ensure stability and safety in riding.

Figure 5:
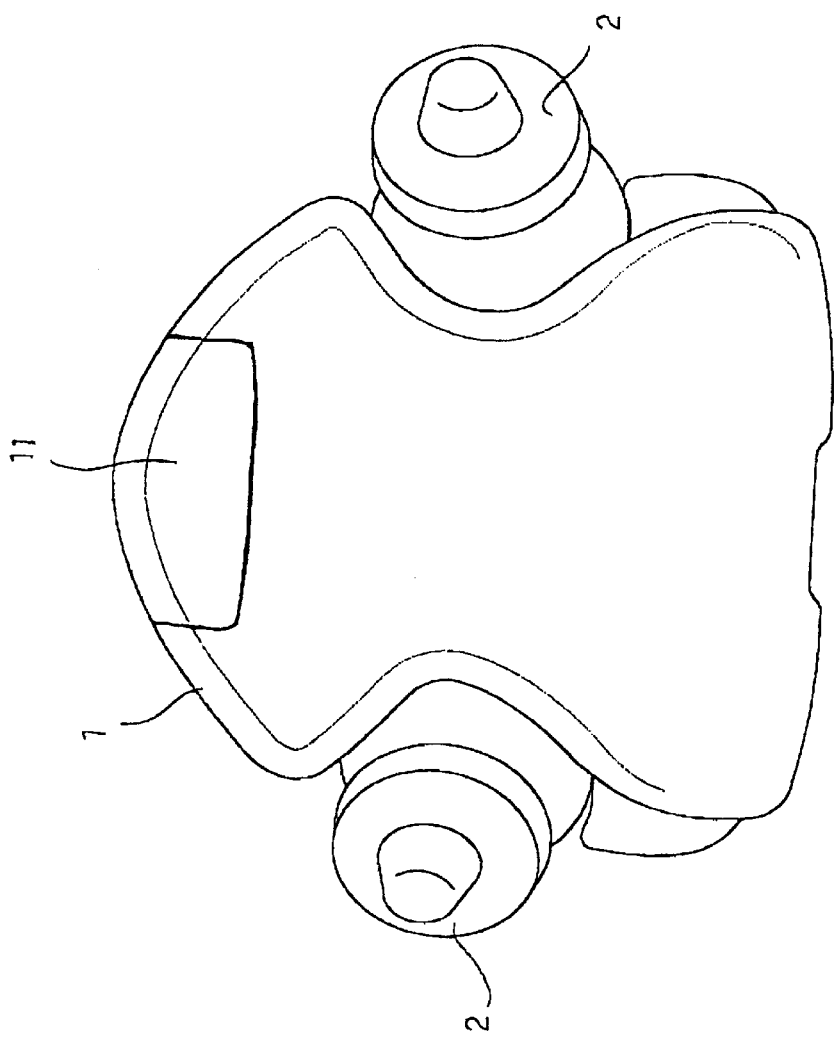
FIG. 5 is a front view of the present invention in which two kettles are placed.

The dent 12 of each side of the main body 1 is diverged forward. Therefore, after the kettle 2 is inlaid in the dent 12 and clamped by the C-shaped clip 13, the kettle 2 is deflected toward outer side of the bicycle to avoid the saddle of the bicycle. Therefore, the user can conveniently and quickly take out the kettle in riding as shown in FIG. 5.

According to the above arrangement, the bicycle-used flow deflecting article cabinet of the present invention includes a main body 1 with curved pattern and low wind resistance The curved article cabinet provides a flow deflecting effect when riding the bicycle and also balances the gravity center of the bicycle body, This helps in ensuring safety in riding and is able to increase the riding speed. In addition, personal small articles of the rider (such as purse, keys, medical articles, etc.) and kettles 2 can be placed in the receptacle 10 and the dents 12 for convenient use.

The above embodiment is only used to illustrate the present invention, not intended to limit the scope thereof. Many modifications of the above embodiment can be made without departing from the spirit of the present invention.

What is claimed is:

1. Bicycle-used flow deflecting article cabinet arranged to be mounted on a rear side of a saddle of the bicycle, the article cabinet comprising a main body with a curved shape including a wider front side facing the saddle and a narrower rear side away from the saddle, said article cabinet including means for accommodating personal articles and for deflecting an airflow around a rider of the bicycle to lower wind resistance and increase riding speed, the article cabinet also serving to balance the bicycle and to enable a user to conveniently use said personal articles placed in the article cabinet.

2. Bicycle-used flow deflecting article cabinet as claimed in claim 1, wherein the main body has substantially triangular lateral faces.

3. Bicycle-used flow deflecting article cabinet as claimed in claim 1, wherein said personal article is a liquid container.

4. Bicycle-used flow deflecting article cabinet as claimed in claim 1, wherein said means for accommodating personal articles comprises indentations respectively formed on opposite lateral sides of the main body, each of said indentations including an inlaid clip for clipping a personal article in said indentations.

5. Bicycle-used flow deflecting article cabinet as claimed in claim 4, wherein two ends of each of said C-shaped clips are formed with dome-like engaging sections for firmly clamping said personal article in said indentations.

6. Bicycle-used flow deflecting article cabinet as claimed in claim 1, wherein said means for accommodating personal articles comprises a receptacle formed in the front end of the main body for receiving a personal article therein, and a cover board for the receptacle.

7. Bicycle-used flow deflecting article cabinet as claimed in claim 6, further comprising indentations respectively formed on opposite lateral sides of the main body, each of said indentations including an inlaid clip for clipping a personal article in said indentations.

8. Bicycle-used flow deflecting article cabinet as claimed in claim 7, wherein said clip is C-shaped.

9. Bicycle-used flow deflecting article cabinet as claimed in claim 7, wherein front sections of the indentations on each side of the main body are shallower than rear sections, causing articles placed in said indentations to project out of said indentations to facilitate removal of the articles from the indentations, and placements of the articles within the indentations.

* * * * *